United States Patent [19]

Lacoste et al.

[11] Patent Number: 5,173,609
[45] Date of Patent: Dec. 22, 1992

[54] DEVICE FOR THE DETECTION OF RADIATION THAT ENDANGERS LIVING BEINGS

[75] Inventors: Francis Lacoste, Chevreuse; Marc Lucas, Paris, both of France

[73] Assignee: Thomson-CSF, Puteaux, France

[21] Appl. No.: 673,397

[22] Filed: Mar. 22, 1991

[30] Foreign Application Priority Data

Apr. 6, 1990 [FR] France ............................. 90 04456
Feb. 15, 1991 [EP] European Pat. Off. ........ 91400397.5

[51] Int. Cl.⁵ .............................................. G01T 1/15
[52] U.S. Cl. ........................ 250/370.07; 364/413.26
[58] Field of Search ............... 250/370.07; 364/413.26

[56] References Cited

U.S. PATENT DOCUMENTS 4,608,655  8/1986  Wolf et al. ......................... 364/569
4,695,730  9/1987  Noda et al. ..................... 250/370.09

FOREIGN PATENT DOCUMENTS 0051520  5/1982  European Pat. Off. .
0175369  3/1986  European Pat. Off. .
0300054  1/1989  European Pat. Off. .
59-12377  1/1984  Japan ............................. 364/413.26
63-238582  10/1988  Japan ............................. 250/370.07

Primary Examiner—Constantine Hannaher
Attorney, Agent, or Firm—Oblon, Spivak, McClelland, Maier & Neustadt

[57] ABSTRACT

Disclosed is a portable device for the measurement of the dose rate and of the doses of photon radiation such as gamma rays, UV rays or X-rays, or charged particles, to which a bearer is exposed. This device has a detector of radiation or particles, a system for computing the cumulative dose and a memory to store data relating to the bearer and to the cumulative doses. The device has a credit card type of format, and is preferably like a badge with a photograph. It has a clock-calender for the storage, in the memory, of a piece of information on dates at the same time as the pieces of information on doses and/or dose rates.

18 Claims, 4 Drawing Sheets

DEVICE FOR THE DETECTION OF RADIATION THAT ENDANGERS LIVING BEINGS

BACKGROUND OF THE INVENTION

1. Field of the Invention

The present invention relates to a device for the detection of radiation that is dangerous to living beings, notably to human beings, and has effects that accumulate over time.

It is known that the gamma radiation produced in nuclear power stations is particularly dangerous. There are standards that lay down that the quantity of radiation received by any individual during his lifetime should stay below a determined quantity, expressed in millirems.

In the same way, radiologists and people who handle X-ray equipment are exposed to doses of radiation whose cumulative effect may be dangerous. Here again, standards lay down that the dose received by any individual in the course of his lifetime should not exceed a preset limit.

There are other types of radiation, such as ultraviolet radiation or radiation from charged particles, the accumulation of doses of exposure to these types of radiation in a given period may also be dangerous.

There are established procedures for checking the doses of radiation received by persons liable to be exposed to gamma radiation. In these procedures, the individuals concerned are made to carry devices that record the doses received.

2. Description of the Prior Art

Up till now, there have been two types of such devices: the first type of device is a photographic film carried by each individual liable to receive dangerous radiation. The drawback of such a device is that it does not give its bearer immediate information, and that this type of detection calls for a relatively complicated system of management of the information on the doses received. Besides, the film gives an indication only on the cumulative dose received during a determined period, generally of the order of one month, and the information that is then given to the bearer is generally very brief, all that he or she knows is whether the received dose is above or below the permissible threshold.

The second type of device takes the form of a bulky pack that houses the following elements: a radiation detector, circuits to memorize the cumulative dose, an alarm that gets triggered when the the dose rate goes beyond a permissible limit, a display of the doses accumulated while the instrument is carried, and means for connection with external circuits.

The devices of the second type are assigned on a general basis to the installation in which dangerous radiation may occur. They are usually placed in a rack where their batteries can be charged. To enter the installation, an individual has to use an identification badge that gives him access to the rack holding the devices and, at this instant, in the rack, a signal tells him which device is assigned to him. A centralized management system thus knows the relationship between the bearer and the device.

When the bearer leaves the installation, he returns the device to the rack and, at this instant, information on the cumulative doses is transmitted to a management center by means of the connector on the device.

This device is a bulky one, and dictates a system of management that is as cumbersome as in the case of the film. It lets the individual concerned know only the dose accumulated while he was wearing the device, i.e. during a period of some hours.

Furthermore, to measure the doses of radiation received by an individual, a portable device designed to record the radiation received by an individual over a lengthy period has been proposed (cf. patent application published as EP 0 300 054). However, the instrument described in this document is relatively bulky, and this fact may dissuade the user from wearing it constantly. In addition, the memorizing of data over a lengthy period is done in a removable permanent memory. This characteristic of being removable also is a factor of insecurity since, if the user forgets to insert the memory, the device in principle does not record the doses received.

The U.S. Pat. No. 4 608 655 describes a dosimeter of radiation received by persons working in the nuclear industry. This dosimeter takes the form of a constantly worn wristwatch. However, since this dosimeter is worn at the end of a member, it measures the doses received at this place and not in the entire body, notably in the trunk. Besides, the dosimeter described in this document carries out only a limited number of operations.

The present invention overcomes the above-mentioned drawbacks.

SUMMARY OF THE INVENTION

The device according to the present invention includes a radiation or particle sensor, a means to compute the cumulative dose and a memory to store data relating to the bearer and to the cumulative doses. It is a device wherein all its constituent elements are housed in a flat package that forms a single block and has the shape and dimensions of a rectangular credit card.

A dosimeter such as this, shaped like a standard-sized credit card, will most frequently and naturally be placed in the bearer's wallet, usually in a pocket near the upper part of the trunk of his body or near his waist. In other words, the configuration of the device of the invention is such that it maximizes the possibility, firstly, of its being worn constantly and, secondly, of its making a representative measurement of the dose received by the entire body.

The permanent identification of the bearer enables easier management for it is not indispensable to transmit the data collected by the device to an information processing center. If the bearer is a person, he will be able to carry out his own checks on the total dose of radiation that he has accumulated. Moreover, owing to the identification means, the accumulation takes place over a lengthy period. The device may even be carried by the individual throughout his lifetime.

The information on the bearer's identity contained in the device may be used for purposes other than that of checking the cumulative dose. These other uses may include the payment of charges or the checking of access to a given place. Thus, there will be a further incentive to the constant wearing of the device.

The personalization of the device can be accentuated by the placing or printing of the bearer's name and/or photograph on it. In this case, the device may also be used as an identification badge that is worn visibly and conventionally in a jacket, i.e. on the right-hand side or left-hand side of the chest, or with a collar or, again, attached to the belt. All these positions are favorable for an accurate measurement of the cumulative dose.

Although the device of the present invention makes it possible to limit action by a management center, such action may continue to be necessary, notably for the checks. This is why, in one embodiment, means are provided to connect the device to an information processing center such as a computer. These connection means include an antenna, for example a radio tag that is formed by a small-sized, flat transmission/reception antenna that may be integrated into the device having a credit card format. In this case, the security related to the use of the device is further reinforced, for the link with an information processing or similar machine can be set up automatically without any action being required on the part of the user and without his having to be even aware of it. By contrast, in the prior art devices, the user had to move an element, notably in order to connect or disconnect it. Furthermore, in the device according to the invention, the connection with a processing center or with a machine sending out commands is obtained in real time.

For the user to be able to have access to the information contained in the memory of the device, advantageously one or more keys, enabling interrogation, as well as a display screen are provided.

According to another aspect of the present invention, in a portable device to measure the dose rate and the doses of photon radiation such as gamma radiation, UV rays and X-rays or of charged particles to which a bearer has been exposed, the following are provided: a radiation or particle sensor, a means to compute the cumulative dose and a memory to store data relating to the bearer and data on the cumulative doses, wherein the device includes a clock-calendar for the storage, in the memory, of a piece of information on dates (day, week, month and year) at the same time as the pieces of information on doses and/or dose rates. This characteristic provides for the autonomy of the device since, with this information on dates, the management of the information can be done over a lengthy period whereas, in the prior art devices, the management was done by means of a system external to the portable device. This characteristic is preferably used with the first aspect of the invention. However, it may be used independently, i.e. it is then not indispensable for the device to have a credit card format.

To enable the memory of the device to be a low-capacity memory, hence to make the device compact and inexpensive, it is especially advantageous for the memorized data to be constantly or periodically updated by means of a micro-controller and the clock-calendar so that the only information kept in memory is information on doses accumulated over periods whose length is all the greater as they are old. For example, the memory will retain only the following data: doses accumulated during each of the preceding seven days; for previous weeks, the doses accumulated for each of the preceding three weeks (for the weeks before that, the doses that were accounted for day by day are erased from the memory); for the months that have elapsed, the doses accumulated for each of the last three preceding months; and for the rest of the current year, the doses accumulated for each of the three preceding quarters. Finally, for previous years, only the dose accumulated for each year will be kept in the memory.

It will be seen that it is thus possible to use a memory of some kilobits whereas, with the prior art devices, memories with appreciably greater capacities were needed. For example, in the European patent No. 300 054, the information on daily doses is collected in a portable memory and remains permanently recorded in this memory. This feature, as described in the document cited, calls for a 0.5 megabit capacity. If the memorizing of information on a daily dose takes up Nbits in memory per data/dose pair, then the memorization of information over ten years will call for $3650 \times N$bits. With the present invention, in the case of the above-mentioned example, for ten years about $(7+3+3+3+9)N=25$ Nbits will be required.

The management of the information kept in memory enables other functions. For example, it is possible to constantly determine the dose accumulated during the thirteen weeks that have elapsed and to activate an alarm if the dose accumulated during these thirteen weeks goes beyond the permitted maximum level of three rems.

For example, again, the device may be used to determine the dose accumulated by a bearer in a determined site during a determined period.

Although the preferred application of the device lies in the detection of the accumulation of doses of radiation received by a person, in another embodiment, the device is assigned to an object or to a place. More specifically in these variants, the device includes an identification of the object or of the place to which it is assigned. For example, if the object is a container of radioactive substances, or of substances that emit X-rays, UV rays or charged particles, the device can be used to determine the doses emitted outwards by this container. In another example, the device is permanently fixed in a determined place in order to measure the accumulation of doses received at this place. In the latter case, it is possible to position several devices in the place to be studied, notably in order to make a point-by-point determination of the exposure to radiation in this place as a function of the date.

In another variant, the device detects the accumulation of ultraviolet radiation by a person. It can then be used notably so that the bearer determines the maximum daily period of exposure to sunlight, thus making it possible to avert cases of sunstroke. This daily maximum period is determined by the device in accordance with the bearer's characteristics contained in its memory: age, skin pigmentation and prior instances of exposure.

In yet another of its aspects, the present invention generally relates to a preferably portable device for the accumulation of data including a computing means and a data storage memory, the device including a clock-calendar to store a piece of information on a date in the memory at the same time as the data, and a controller or micro-controller so that the cumulative totals are constantly or periodically updated so that the only cumulative totals kept in the memory are those for periods whose length is all the greater as they are old.

BRIEF DESCRIPTION OF THE DRAWINGS

Other characteristics and advantages of the present invention will appear from the following description of certain of its embodiments, the description being made with reference to the appended drawings, of which.

DETAILED DESCRIPTION OF THE INVENTION

The example that we shall describe with reference to the figures is one of a device that can be carried by a person. This device takes the form of a card (FIG. 1) with the standardized format of a credit card. It enables the individual measurement of exposure (dose and dose rate) to photon radiation of the gamma radiation, ultraviolet (UV) radiation or X-radiation type, or to charged particles. The main example herein is that of the detection of gamma rays.

Figure 2:
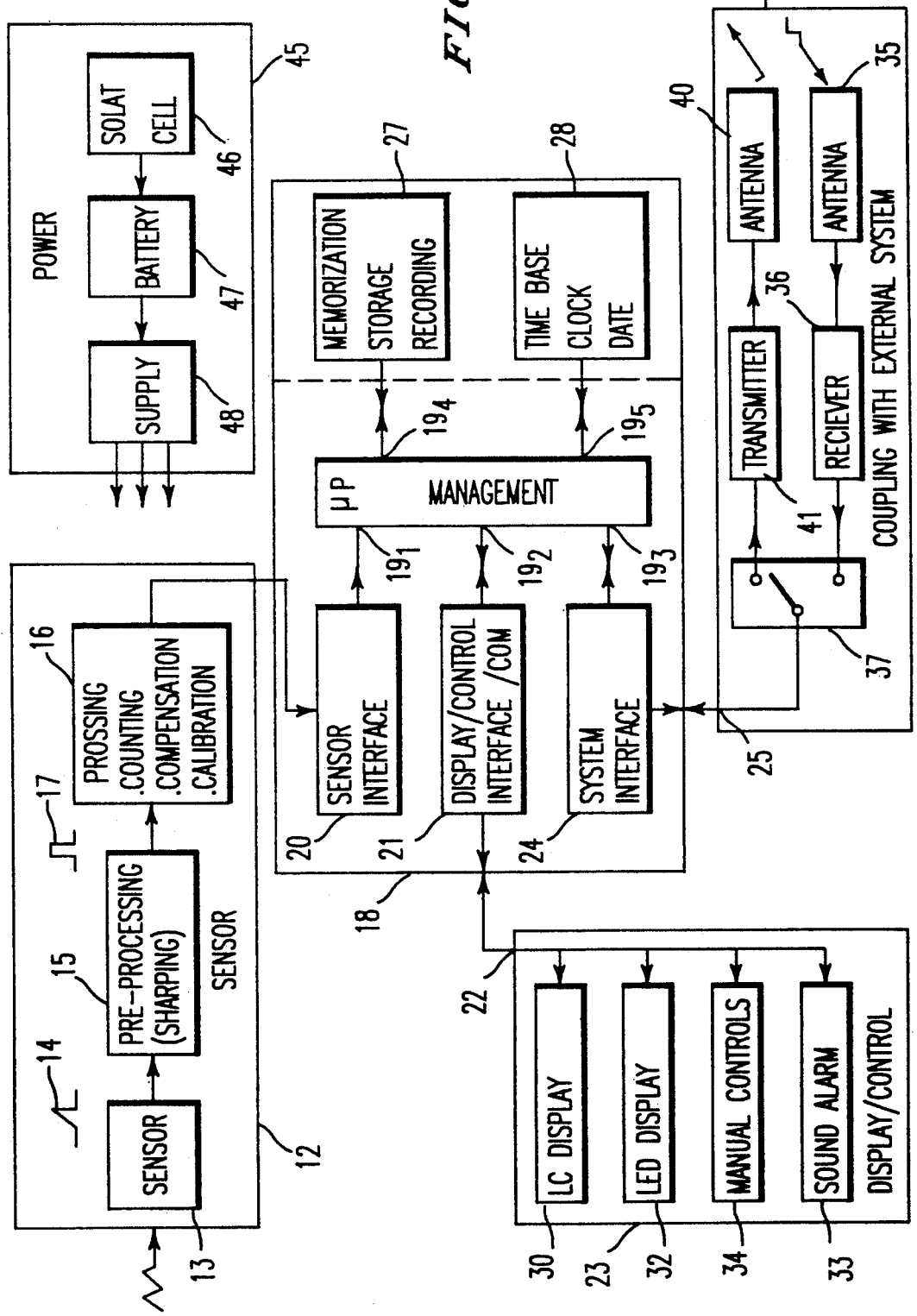
FIG. 2 is a diagram of the circuits of the device of FIG. 1.
Figure 4:
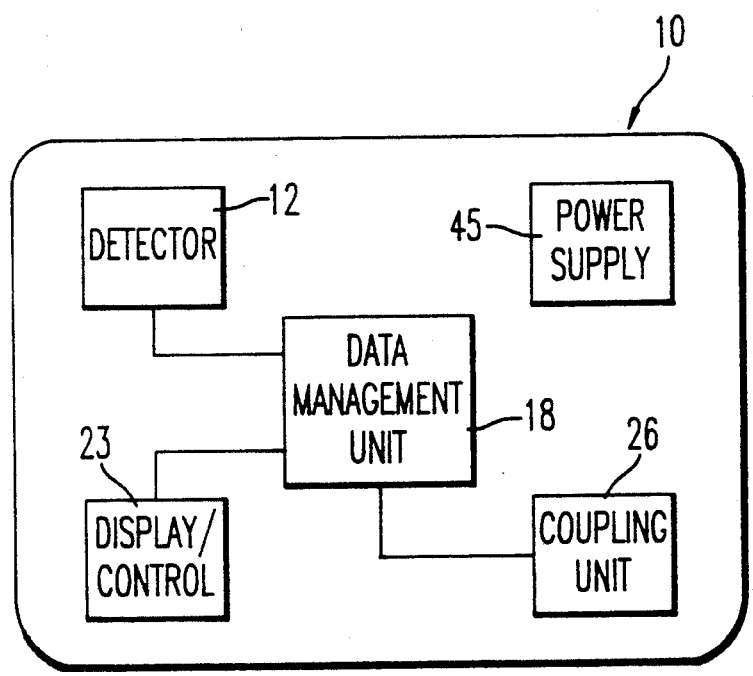
FIG. 4 is a diagram showing the elements of the device of the present invention on a single card.

FIG. 4 is a block diagram of the various elements and functions that are found inside the device 10, and FIG. 2 shows details of the device shown in FIG. 4.

This device 10 has a detection part 12 with a solid-state sensor 13 designed to detect the incident radiation, the cumulative effects of which may endanger persons. The sensor 13 is a semiconductor element that is small-sized so that it can be housed in the flat card 10. Its purpose is to give pulses 14 the number of which is proportional to the flow of incident photon particles.

The pulses 14 are supplied to a processing circuit 16 by means of a shaping element 15.

The circuit 16 counts up the shaped pulses 17 that it receives, and also carries out the linearization and the calibration of the sensor. The calibration of the sensor is generally done in the factory by means of a reference source, for example a cobalt 60 source when the sensor is designed for the detection of gamma radiation. The linearization too is done in the factory. It consists in converting the response of the sensor in such a way that the number of pulses counted is proportional to the number of millirems to be detected.

The sensor 13 is, for example, of the type described in the European patent application published as EP 0 175 369.

The output of the circuit 16, which also constitutes the output of the detection unit 12, is connected to the input of a data management unit 18.

This management unit has a microprocessor 19 with an input $19_1$ connected to the output of the circuit 16 by means of an interface circuit 20.

The microprocessor 19 also has inputs-outputs $19_2$, $19_3$, $19_4$ and $19_5$.

The input-output $19_2$ is connected by means of an interface circuit 21 to the input-output 22 of a control and display unit 23 which shall be described further below.

The input-output $19_3$ is connected by means of an interface circuit 24 to the input-output 25 of a coupling unit 24 for coupling with external organs. This unit 26 shall also be described further below.

The input-output $19_4$ is connected to a memorization block 27 designed to store information on the identity of the person to whom the device is assigned and to record the measurements resulting from the signals given by the unit 12. These measurements are recorded with a date given by a time base 28 with a clock, connected to the input-output $19_5$.

Figure 1:
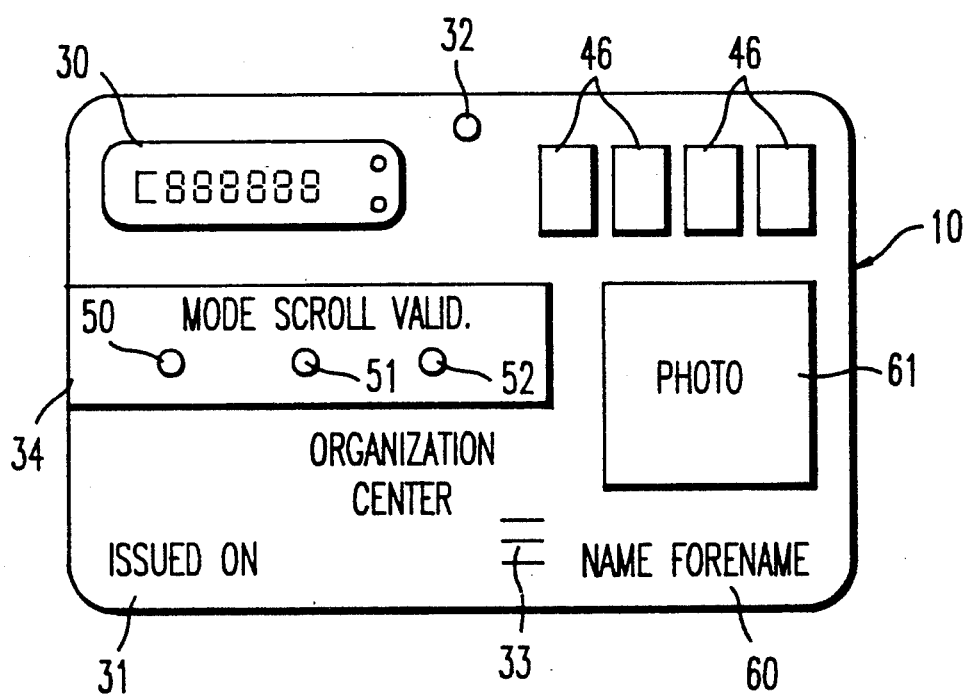
FIG. 1 shows a view of the main face of the device of the invention.

The unit 23 has a liquid crystal type of display device 30 giving information on the main face 31 of the device 10 (FIG. 1). The unit 23 also has a light-emitting diode 32 designed to give a warning light signal when the dose rate exceeds the prescribed limit or when the dose accumulated during a determined time goes beyond permissible values. This warning or alarm information also appears in the form of a sound through the use of an acoustic device 33.

The unit 23 also has interrogation or data introduction elements 34. These elements 34 shall be described further below in relation to FIG. 1.

The coupling unit 26 enables the reception of information from the exterior by means of a reception antenna 35 that is connected to the input-output 25 by means of a reception circuit 36 and a change-over switch 37 enabling the unit 26 to be placed either in a state of reception or in a state of transmission.

In order to transmit information to a external system, the unit 26 also has a transmission antenna 40 connected to the input-output 25 by means of a transmission circuit 41 and the change-over switch 37.

The unit 26 is, for example, of the type found in the "TADICARD" system from the firm Tadiran (Israel).

As a variant, the coupling of the device 10 with an external system is done by optic means or by means of electrical contacts.

The electrical supply power of the circuits of the device 10 is obtained by means of a unit 45 including a solar cell 46, an accumulator 47 that is charged by the cell 46 and supplies a power pack 48 for the various elements of the device.

In one embodiment, the supply of the pack 26 is got by the induction of a current in a flat coil (not shown) prompted by the presence of an electromagnetic field in the vicinity of the card.

The control keyboard 34 has three keys 50, 51 and 52 (FIG. 1).

The activation of the key 50 determines the mode of operation. For example, after this key 50 is pressed once, the device 30 displays the identity of the user who is the bearer of the device. When this key is pressed twice, the device displays the dose accumulated (in millirems) by the bearer during a determined period. As shall be seen here below, this period is determined by activating the key 51.

When the key 50 is pressed thrice, the rate or flow of detected particles is displayed. By pressing the key four times successively, the user determines the difference between the dose received during the predetermined period and the permissible dose during this period. Finally, pressing the key five times in succession activates the display of the date and enables a time-setting operation.

As a variant, after the key 50 is pressed for the first time, the user is asked for a code and introduces it into the device by means of a keyboard (not shown) which may be digital, alphabetical or alphanumerical (as in a pocket calculator or pocket database). Then this code is validated by pressing the key 52. If the code is wrong, information cannot be displayed.

The second key 51, called a scrolling key, activates the display of the various categories of each mode. For example, when the dose has been displayed by pressing the key 50 twice, the first pressing of the scrolling key 51 indicates the dose that has accumulated in the past hour. After the second pressing of the key, it is the dose that has accumulated in the past 24 hours that is displayed. When the key has been pressed thrice, it is the dose that has accumulated over the past week that is displayed. When the key is pressed four times, the dose that has accumulated in the past month is displayed, and when the key is pressed five times, the dose accumulated for the year is displayed. By pressing the key six times, it is possible to display the total dose that has accumulated ever since recordings began to be made of the radiation to which the bearer is exposed.

The third key 52 is used to take account of or to validate the displayed parameter. This key is useful notably for the time-setting operation and for validating a code as explained here above.

In addition to the liquid crystal display 30, the solar cells 46, the control panel 34 and the acoustic device 33, the visible face of the device 10 also has a space 60 with the bearer's identity and a space 61 for his or her photograph.

The type of electrical power supply used is clearly not limited to the one just described. Instead of an accumulator, it is possible to provide for a battery or for an accumulator that is rechargeable from the mains.

The memory 17 of the unit 18 can be used to store not only information on the bearer's identity but also medical information about him, for example his blood group or cases of prior illness. Thus, in the event of a crisis or an accident, the emergency assistance organizations will have useful information available to optimize the treatment of the patient. This information is accessible either directly through the keyboard 34 or only by means of the antenna 40 or a similar connection device.

When the portable device is handed over to its bearer, the organization responsible for issuing the device will record the following information in the memory 27: the bearer's identity with his name, forenames, age and nationality (if applicable), his medical characteristics as indicated hereabove, information on his professional status and finally, and above all, the maximum permissible doses as these doses may vary from one individual to another notably according to age.

Furthermore, the data in the memory 27 can be updated through the unit 26.

During its usual operation, the device enables the recording of doses during predetermined periods: hours, days, weeks, months, quarters, years etc. It can also record the curve of variations in the dose rates as a function of the date.

In one embodiment, the information on doses and dose rates is associated not only with the date but also with the location of the bearer. These pieces of information on place are, for example, communicated automatically to the device by the receiver antenna 35.

In one embodiment, the pieces of information stored in the memory 27 are encrypted in a differentiated manner, notably so that the access to the information through the external system can be obtained only by authorized persons or organizations. For example, medical information will be encrypted in a first way and information on professional status will be encrypted in a second way so that medical information is accessible only to a medical service and information on professional status is accessible only to another authorized department.

Figure 3:
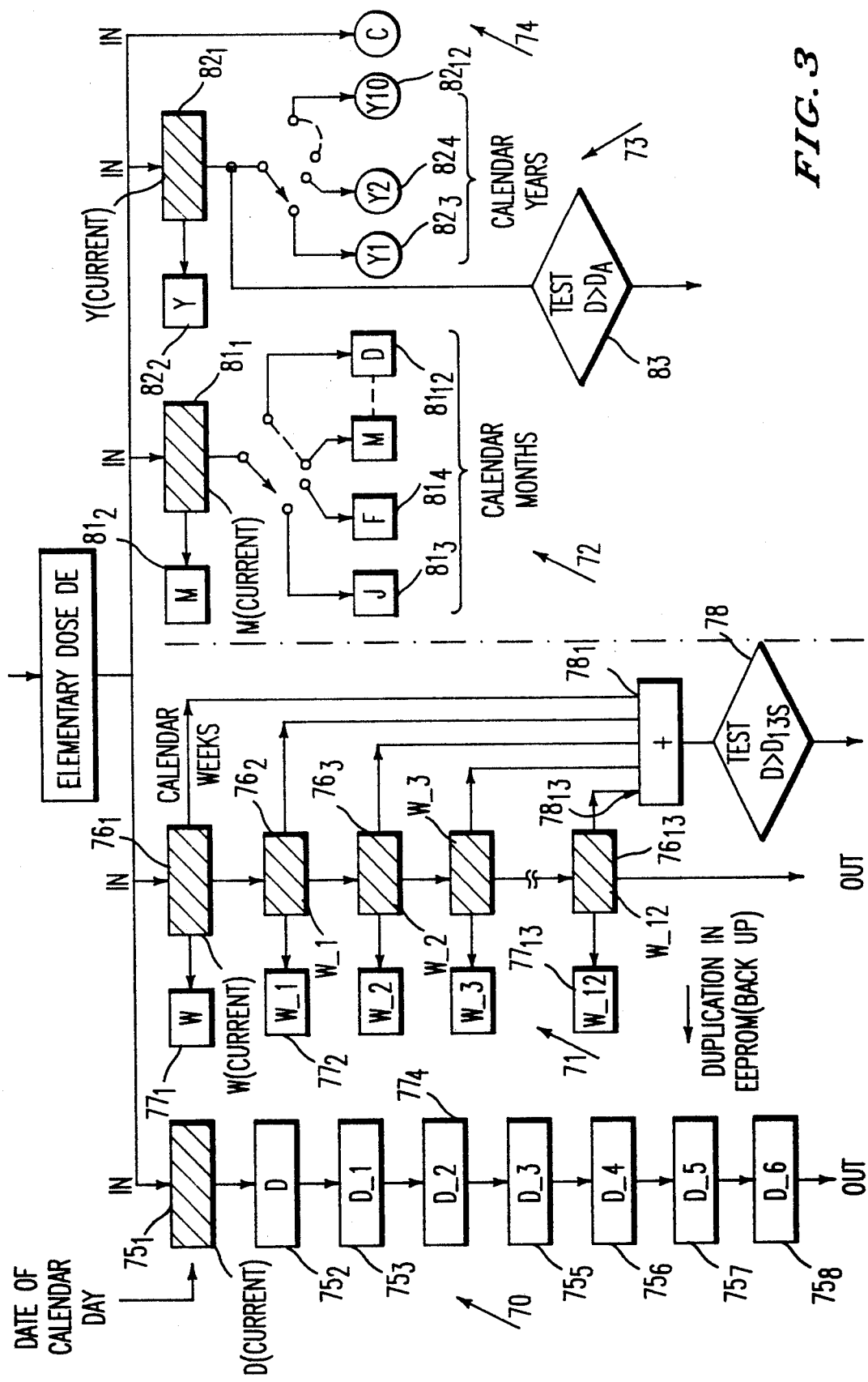
FIG. 3 is a diagram of the organization of memories in the circuits of FIG. 2.

Referring to FIG. 3, we shall now describe an example of organization of the memories 27 of the circuits of FIG. 2.

In this example, there are four blocks of memories, a block 70 for the recording and storage of daily doses, a block 71 for the recording and storage of weekly data, a block 72 for the recording and storage of monthly data, and a block 73 for the recording and storage of yearly data. Finally a memory 74 is provided for the general totalling of the doses received by the individual to whom the badge has been assigned.

The block 70 has, firstly, a random-access memory or RAM $75_1$ that registers, for each calendar day and in the form of a binary number, the number of elementary 10-microrem doses received from the circuit 16.

The contents of the memory $75_1$ are reset at zero every 24 hours, for example at 0 hours.

This memory $75_1$ is connected to an EEPROM type memory $75_2$. Unlike a RAM, this type of memory does not require any supply of electrical power to preserve data. In this respect, it is therefore similar to a read-only memory. However, it is erasable by means of an electrical signal and, after erasure, it is available for a fresh recording or storage of data.

The connection of the RAM $75_1$ to the EEPROM $75_2$ is such that the memory $75_1$ constantly sheds its contents into the memory $75_2$.

The memory $75_2$ is followed by memories $75_3$, $75_4$, $75_6$, $75_7$ and $75_8$ which are all EEPROM type memories. The memories $75_2$ to $75_8$ are series connected in such a way that every 24 hours, for example at 0 hours, the contents of an EEPROM are shed into the next memory. In other words, the contents of the memory $75_2$ are poured into the memory $75_3$, the contents of the memory $75_3$ are poured into the memory $75_4$, etc. Naturally, these operations are carried out under the control of a microprocessor so that each EEPROM first sheds its contents into random-access memory of the microprocessor before being erased and so that the microprocessor then feeds the next memory.

During this process, the contents of the last memory $75_8$ are erased without being recovered.

Thus, the memory $75_2$ contains the dose that has accumulated during the current calendar day, and the memories $75_3$ to $75_8$ contain the doses that have accumulated during preceding days: D-1, D-2, ... D-6.

The block 71 has a random-access memory or RAM $76_1$, similar to the memory $75_1$. It is reset at zero every calendar week, i.e. every seven days. This random-access memory is connected to another random-access memory $76_2$. The contents of the memory $76_1$ are poured into the memory $76_2$ once a week on a fixed day and at a fixed time. In the same way, there is provision for twelve other series-connected random-access memories $73_3$ to $73_{13}$. The contents of each random-access memory are poured into the next memory each week on a fixed date. Thus, the memory $76_1$ contains the dose that has accumulated since the start of the current week W, the memory $76_2$ stores the dose that has accumulated during the preceding week (W-1), the memory $76_3$ contains the dose that has accumulated during the week W-2, and so on until the random-access memory $76_{13}$ which contains the dose that has accumulated during the week W-12.

During the updating operation, the contents of the last memory $76_{13}$ are lost.

Besides, with each of the memories $76_1$, $76_2$ ... $76_{13}$, there is associated an EEPROM $77_1$ ... $77_{13}$ with contents identical to those of the associated RAM. These memories provide backups for the contents of the RAMs 76.

The contents of each random-access memory $76_1$, $76_2$ ... $76_{13}$ is applied to a corresponding input $78_1$ ... $78_{13}$ of an adder 78 that permanently computes the sum of the doses that have accumulated in these thirteen memories. If this dose goes beyond a threshold $D_{13S}$, an alarm is triggered.

For the block 71, we could have envisaged a structure similar to that of the block 70 without duplication of memories. However, the presence of random-access memories is preferable in order to enable the connection to the adder 78.

The block 72 has a random-access memory $81_1$ that records the doses accumulated during the current month M. This RAM $81_1$ is connected to an EEPROM $81_2$ so that, at each instant, the contents of the memory $81_2$ are identical to those of the memory $81_1$.

Furthermore, the unit 72 has twelve other EEPROMs $81_3$ to $81_{14}$ that correspond to the twelve months of the year: Jan., Feb. . . . Dec.

At the end of each calendar month, the contents of the memory $81_1$ are poured into that memory, among the EEPROMs $81_3$ to $81_{14}$, that is assigned to the month that has just elapsed. Then the contents of the memories $81_1$ and $81_2$ are reset at zero.

At the end of each calendar year, the contents of the memories $81_3$ to $81_{14}$ are reset at zero.

The set of memories 73 includes a RAM $82_1$ that records the doses accumulated in the current year Y. With this random-access memory $82_1$, there is associated an EEPROM $82_2$ having contents identical to those of the memory $82_1$, and there is provision for ten EEPROMs $82_3$ to $82_{12}$, each of which is assigned to the storage of information on the doses accumulated during a previous year. Thus, the memory $82_3$ records the dose accumulated during the preceding calendar year $Y_1$ and so on until the memory $82_{12}$ containing information on the dose accumulated during the year $Y_{10}$ ten years prior to the current year.

The memory $82_3$ is connected to the memory $82_4$ in such a way that, at the end of each calendar year, the contents of this memory $82_3$ are poured into the memory $82_4$ and so on. The contents of the memory $82_{11}$ are poured into the memory $82_{12}$ and the contents of the latter memory are lost.

Besides, the output of the memory $82_1$ is connected to the input of a comparator 83 in order to constantly compare the dose accumulated during the current year with the maximum permissible yearly dose $D_Y$.

As a variant, there is no connection between the memories $82_3$, $82_4$ . . . $84_{12}$ and, at the end of the first calendar year in which the device is used, the contents of the memory $82_1$ are poured into the EEPROM $82_{12}$. The next year, the contents of the memory $82_1$ are poured into the memory $82_{11}$, etc.

The memory 74 is of the EEPROM type. It contains information on the dose that has accumulated during the lifetime or professional career of the bearer of the device.

The microprocessor is programmed so that, at initialization, the various EEPROM type memories may be loaded with a given starting value. Thus, when the bearer receives a new badge, it is loaded with all the dosimetrical information about him.

It will be noted that the information applied to the input of the adder 78 includes information on doses as well as information on dates. In the same way, at the input of the comparator 83, a piece of data on a dose is associated with a piece of data on a date. With this arrangement, when there is an instance of the threshold $D_{135}$ or $D_Y$ being exceeded, this instance of exceeding the threshold can be recorded with its date.

In each memory, a pair of pieces of data is recorded, these are pieces of data on a dose and a date. If each dose is encoded on 16 bits and each date is also encoded on 16 bits, the EEPROM volume necessary is:

$$32 \times (7 + 13 + 12 + 10) \simeq 1.3 \cdot 10^3 \text{ bits.}$$

This is a relatively small EEPROM volume. The RAM volume is even smaller.

In one example, the device has contacts enabling it to be connected to a telephone MODEM. Thus, when the bearer is away from the management center or monitoring center, he can transmit the information contained in the device through the telephone lines.

What is claimed is:

1. A portable device for the measurement of a dose rate and cumulative doses of photon radiation such as gamma rays, ultra-violet rays or X-rays, or of charged particles, to which a bearer is exposed, comprising:
   a detector for detecting such radiation or particles;
   computing means for computing the dose rate and cumulative doses based on said radiation or particles detected by said detector;
   a memory for storing data relating to the bearer, and the dose rate and the cumulative doses computed by said computing means;
   a clock-calendar for storing, in the memory, information on dates at a same time as the data relating to the dose rate and cumulative doses are stored in said memory;
   a microprocessor for controlling storing said data relating to the bearer, the dose rate and the cumulative doses in the memory, wherein the stored data relating to the dose rate and cumulative doses is periodically updated so that the memory contains only information relating to doses received over a limited number of time periods, wherein when said data relating to the dose rate and cumulative doses is updated, most recently computed dose rate and cumulative doses data is stored in the memory and dose rate and cumulative doses data older than said limited number of time periods is erased from said memory.

2. A portable measurement device according to claim 1, wherein the memory contains information on daily doses for most recent periods, weekly doses for the immediately preceding period, monthly doses for a certain number of periods preceding the weekly periods and yearly doses for the oldest periods.

3. A portable measurement device according to claims 1 or 2 wherein the detector, computing means, memory, clock-calendar and microprocessor are all housed in a flat package in the shape of a standard-size rectangular credit card.

4. A portable measurement device according to claim 3, further comprising, on a main face of the package readable information pertaining to the bearer.

5. A portable measurement device according to any of claims 1-4, further comprising connection means for connecting said portable measurement device to a data introduction and/or information processing system.

6. A portable measurement device according to claim 5, wherein the connection means includes an antenna of a radio tag type.

7. A portable measurement device according to any of claims 1-4, further comprising means for storing, into the memory, information representing a location of the bearer.

8. A portable device according to any of claims 1-4 further comprising:

display means for displaying the data relating to the cumulative doses and/or of the dose rate; and means for manually selecting the data to be displayed.

9. A portable measurement device according to any of claims 1-4, further comprising an alarm to inform the bearer that the dose rate exceeds a prescribed limit and/or that the cumulative doses during a given period exceeds a predetermined limit.

10. A portable measurement device according to any of claims 1-4, further comprising means for memorizing instances in which cumulative doses have exceeded one or more predetermined limits, these instances being recorded in the memory along with their dates.

11. A portable measurement device according to any of claims 1-4, wherein the bearer is a person, and the data relating to the bearer stored in said memory relates to their identity.

12. A portable measurement device according to claim 11, wherein the data relating to the bearer stored in the memory further includes medical data on the bearer.

13. A portable measurement device according to any of claims 1-4, wherein said detector comprises a solid-state sensor.

14. A portable measurement device according to any of claims 1-4, further comprising an electrical power supply source.

15. A portable measurement device according to any of claims 1-4, wherein said portable device is placed on an object, for example a container of substances emitting photon radiation such as gamma rays, X-rays or ultra-violet rays, or charged particles.

16. A portable measurement device according to claim 1, wherein the memory contains information on cumulative doses for first periods and information on cumulative doses for second periods which are greater than the first periods, the second periods being older than the first periods.

17. A portable device for the measurement of a dose rate and cumulative doses of photon radiation such as gamma rays, ultra-violet rays or X-rays, or of charged particles, to which a place is exposed, comprising:

a detector for detecting such radiation or particles;

computing means for computing the dose rate and cumulative doses based on said radiation or particles detected by said detector;

a memory for storing data relating to the place of exposure, and the dose rate and the cumulative doses computed by said computing means;

a clock-calendar for storing, in the memory, information on dates at a same time as the data relating to the dose rate and cumulative doses are stored in said memory;

a microprocessor for controlling storing said dose rate and cumulative doses data in the memory, wherein the stored data relating to the dose rate and cumulative doses is periodically updated so that the memory contains only information relating to doses received over a limited number of time periods, wherein when said data relating to the dose rate and cumulative doses is updated, most recently computed dose rate and cumulative doses data is stored in the memory and dose rate and cumulative doses data older than said limited number of time periods is erased from said memory.

18. A device for the accumulation of data, comprising:

means for generating rate and cumulative total data;

a memory for storing said rate data and cumulative total data;

a clock-calendar to store a piece of information on a date in the memory at the same time as the rate data and cumulative total data is stored in said memory;

a microprocessor for controlling storing said rate data and the cumulative total data in the memory, wherein the stored data relating to the rate data and cumulative total data is periodically updated so that the memory contains only information relating to rate data and cumulative total data received over a limited number of time periods, wherein when said data relating to the rate data and cumulative total data is updated, most recently generated rate data and cumulative total data is stored in the memory and rate data and cumulative totals data older than said limited number of time periods is erased from said memory.

* * * * *